(12) United States Patent
Kawaguchi et al.

(10) Patent No.: US 7,772,792 B2
(45) Date of Patent: Aug. 10, 2010

(54) ROTATION CONTROL DEVICE

(75) Inventors: Tadashi Kawaguchi, Hiratsuka (JP);
Jun Morinaga, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 455 days.

(21) Appl. No.: 11/791,040

(22) PCT Filed: Nov. 16, 2005

(86) PCT No.: PCT/JP2005/021013

§ 371 (c)(1),
(2), (4) Date: May 17, 2007

(87) PCT Pub. No.: WO2006/054582

PCT Pub. Date: May 26, 2006

(65) Prior Publication Data
US 2008/0164832 A1    Jul. 10, 2008

(30) Foreign Application Priority Data
Nov. 17, 2004   (JP)  .............................. 2004-333678

(51) Int. Cl.
*H02P 5/00* (2006.01)
(52) U.S. Cl. ...................................... 318/461; 318/432
(58) Field of Classification Search ................ 318/461, 318/432, 434, 798, 800
See application file for complete search history.

(56) References Cited

U.S. PATENT DOCUMENTS

| 6,054,844 A * | 4/2000 | Frank ........................... 322/16 |
| 6,157,884 A * | 12/2000 | Narita et al. ................... 701/51 |
| 6,370,470 B1 * | 4/2002 | Yamamura et al. ............ 701/96 |
| 6,394,208 B1 * | 5/2002 | Hampo et al. ............ 180/65.25 |
| 6,777,904 B1 * | 8/2004 | Degner et al. ................ 318/609 |

FOREIGN PATENT DOCUMENTS

| JP | 2001-10783 A | 1/2001 |
| JP | 2001-11897 A | 1/2001 |
| JP | 2004-169466 A | 6/2004 |

OTHER PUBLICATIONS

Notification Concerning Transmittal of International Preliminary Report on Patentabllllty, Chapter I of the Patent Cooperation Treaty, and Written Opinion of the International Searching Authority, dated May 22, 2007, for PCT/JP2005/021013, 4 sheets.

* cited by examiner

*Primary Examiner*—Rina I Duda
(74) *Attorney, Agent, or Firm*—Frishauf, Holtz, Goodman & Chick, P.C.

(57) ABSTRACT

To rotate a rotary body at a constant velocity, a swing control device of an electric rotary excavator controls rotation of the rotary body with a small first torque command value. By contrast, when operating a swing lever for acceleration, the rotation is controlled with a larger second torque command value. The first torque command value is generated based on a deviation between a velocity command value for an electric motor that rotates the rotary body and a measured velocity of the rotary body, and the second torque command value has a larger absolute value than the first torque command value and is obtained by adding a feed-forward torque command value to the first torque command value.

6 Claims, 14 Drawing Sheets

ROTATION CONTROL DEVICE

This application is a U.S. National Phase Application under 35 USC 371 of International Application PCT/JP2005/021013 filed Nov. 16, 2005.

TECHNICAL FIELD

The present invention relates to a swing control device for controlling a rotary body which is rotated by an electric motor and a construction machine.

BACKGROUND ART

Recently, hybrid electric rotary excavators have been being developed, in which a rotary body is driven by an electric motor while other members such as a work equipment and a carrier are driven by a hydraulic actuator (see, for instance, Patent Document 1).

In such electric rotary excavators, since the rotation of the rotary body is driven by the electric motor, even when the rotary body is rotated simultaneously with lifting up of a hydraulically-driven boom and arm, the rotation of the rotary body is not affected by the lifting of the boom and the arm. Accordingly, an energy loss at control valves or the like can be reduced as compared to an arrangement in which the rotary body is hydraulically driven, thereby enhancing energy efficiency.

[Patent Document 1] JP-A-2001-11897

DISCLOSURE OF THE INVENTION

Problems to be Solved by the Invention

However, when an operator switches to an electric rotary excavator from a hydraulically-driven excavator, the operator may have a sense of strangeness because the operation of the rotary body is not affected by the operation of the work equipment.

For instance, in the hydraulically-driven excavator, when a posture is changed by lifting down the boom and extending the arm concurrently with the rotation of the rotary body, the rotation velocity slows down due to increase in the inertia moment of the whole rotary body. On the other hand, in the rotary body driven by the electric motor, the rotary body is rotated at a rotation velocity corresponding to an operational amount of a swing lever, irrespective of changes in the inertia moment.

In controlling the rotation of the rotary body, it may be possible to intentionally arrange such changes of the inertia moment to affect the rotation velocity by suppressing to a small value a torque command value for driving the electric motor. However, it may cause, for example, a response delay in normal operations, and lead to degradation of operational feeling and workability.

An object of the present invention is to provide a swing control device and a construction machine for controlling a rotary body that are capable of changing a rotation velocity of the rotary body in accordance with the disturbance when receiving a disturbance associated with a posture change or the like, and also capable of maintaining a desired level of operational feeling and workability in normal operations.

A disturbance relates to an action that changes the rotation velocity of an electric motor excluding an intentional change of the rotation velocity of the electric motor by a lever input. For instance, in the electric rotary excavator, the disturbance includes an inertial load change associated with a change of inertia moment around a rotation axis that is caused by such a posture change as operation of a boom and an arm, a reaction force arising from a contact of a work equipment with an obstacle, a force in the direction of gravity during an operation on a sloping surface, and the like.

Means for Solving the Problems

A swing control device according to an aspect of the present invention is the swing control device to control a rotary body rotated by an electric motor, wherein a velocity command value generated to rotate the rotary body at a predetermined target velocity is substantially constant, and an absolute value of a second torque control value generated based on the velocity command value when the velocity command value is changed is controlled to be larger than an absolute value of a first torque command value generated based on the velocity command value when a measured velocity of the rotary body is changed.

It should be noted that "when a measured velocity of the rotary body is changed" shall include cases not only where a disturbance is affecting, but also where the measured velocity of the rotary body is changed due to a response delay of the rotary body.

According to the aspect of the present invention, taking an example of a construction machine such as an electric rotary excavator, the swing control device controls the rotation of the rotary body by the small first torque command value in a state where the rotary body is rotated at a constant velocity with the velocity command value substantially fixed. Accordingly, when such a disturbance as to change the inertia moment of the whole rotary body is caused to applied by extending and retracting the boom and the arm, the change of the inertia moment starts to affect the rotation velocity of the rotary body. With the rotation velocity varying in response to the extension and retraction of the boom and the arm, an operator can perform the rotation with the same feeling as in the hydraulic-driven excavator.

On the other hand, during normal operations where the velocity command value is changed by an operation of the swing lever, the rotation of the rotary body is controlled by the large second command value. Thus, not only a good and quick operational feeling can be obtained, but also the workability is free from risk of being degraded.

According to another aspect of the present invention, it is desirable that a swing control device to control a rotary body rotated by an electric motor performs operations including: determining whether a disturbance is applied to the rotary body or not; when applied, driving the electric motor with a first torque command value; and when not applied, controlling the electric motor to be driven with a second torque command value, an absolute value of the second torque command value being larger than the absolute value of the first torque command value According to this aspect of the present invention, whether the disturbance caused by extending and retracting the boom and the arm is applied to the rotary body is determined by a signal from an operation lever of the work equipment or the like. Then, when the operation lever, etc, is operated while the rotation operation is performed by the swing lever, the swing control device detects the operation of the operation lever and determines that a disturbance is being applied to the rotary body, and the rotation of the rotary body is controlled by the small first torque command value. Accordingly, with the rotation velocity changing in accordance with the extension and retraction of the boom and the arm, the operator can perform the rotation operation with the same feeling as in the hydraulic-driven excavator.

In addition, when only the rotation operation is performed by the swing lever while the boom and the arm are not operated at all during the rotation, the swing control device also determines the disturbance action by a signal from the operation lever of the work equipment or the like. Accordingly, in such a case, the rotation of the rotary body is controlled by the large second torque command value. As described above, the operator can obtain a good and smart operational feeling, and the workability is also free from risks of being degraded.

According to the aspect of the present invention, it is desirable that the swing control device drives the electric motor with the second torque command value when an absolute value of a change rate of the velocity command value is larger than a predetermined value, and that the swing control device drives the electric motor with the first torque command value when the absolute value of the change rate of the velocity command value is equal to or less than the predetermined value.

The change rate of the velocity command value herein is a value computable by differentiating the velocity command value. In addition, the velocity command value may include a velocity command value to drive the work equipment or the like mounted on the rotary body in addition to a velocity command value to drive the rotary body.

According to this aspect of the present invention, the switch between the first and the second torque command value is performed based on the comparison of the absolute value of the change rate of the velocity command value. With the arrangement, for instance, when a sudden operation is performed in operating the lever to generate a velocity command value, the absolute value of the change rate of the velocity command value is larger than the predetermined value, and the large second torque value is output. Hence, the movement of the rotary body is also responsive to such a sudden operation.

Conversely, when only a slight operation of the lever is needed, the absolute value of the change rate of the velocity command value is equal to or less than the predetermined value, so that the rotary body is rotated with a slow responsiveness by the small first torque command value. In short, the controllable field of the small first torque command value expands.

A construction machine according to another aspect of the present invention including: a rotary body rotated by an electric motor; and the swing control device of the present invention that controls the rotary body.

According to this aspect of the present invention, as described above, the rotation velocity of the rotary body can change in accordance with the disturbance, and a good operational feeling and workability during normal operations can be maintained.

EXPLANATION OF CODES

Figure 1:
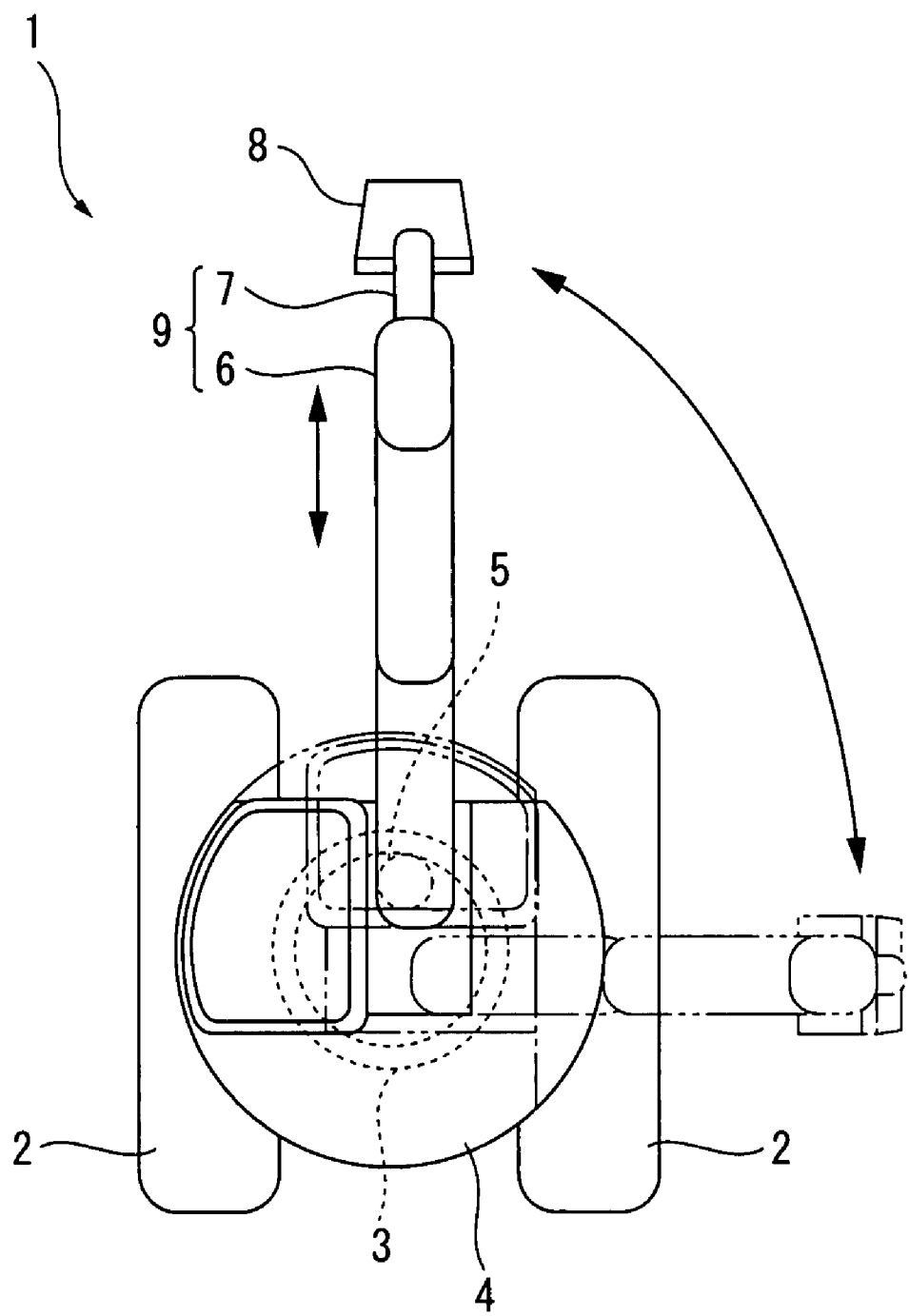
FIG. 1 is a plan view showing a construction machine according to a first embodiment of the present invention.

1: electric rotary excavator as construction machine
4: rotary body
5: electric motor
50: swing control device
51: (first) velocity command value generating means
52: acceleration command value calculating means
53: feed-forward torque command value generating means
54: torque command value generating means
55: (second) velocity command value generating means
56: work equipment velocity command value generating means
57: acceleration command value comparing and determining means
58: velocity command value comparing and determining means
541: switch
K1: velocity gain
K2: velocity gain

BEST MODE FOR CARRYING OUT THE INVENTION

First Embodiment

[1-2] Overall Arrangement

A first embodiment of the present invention will be described below with reference to the attached drawings.

Figure 2:
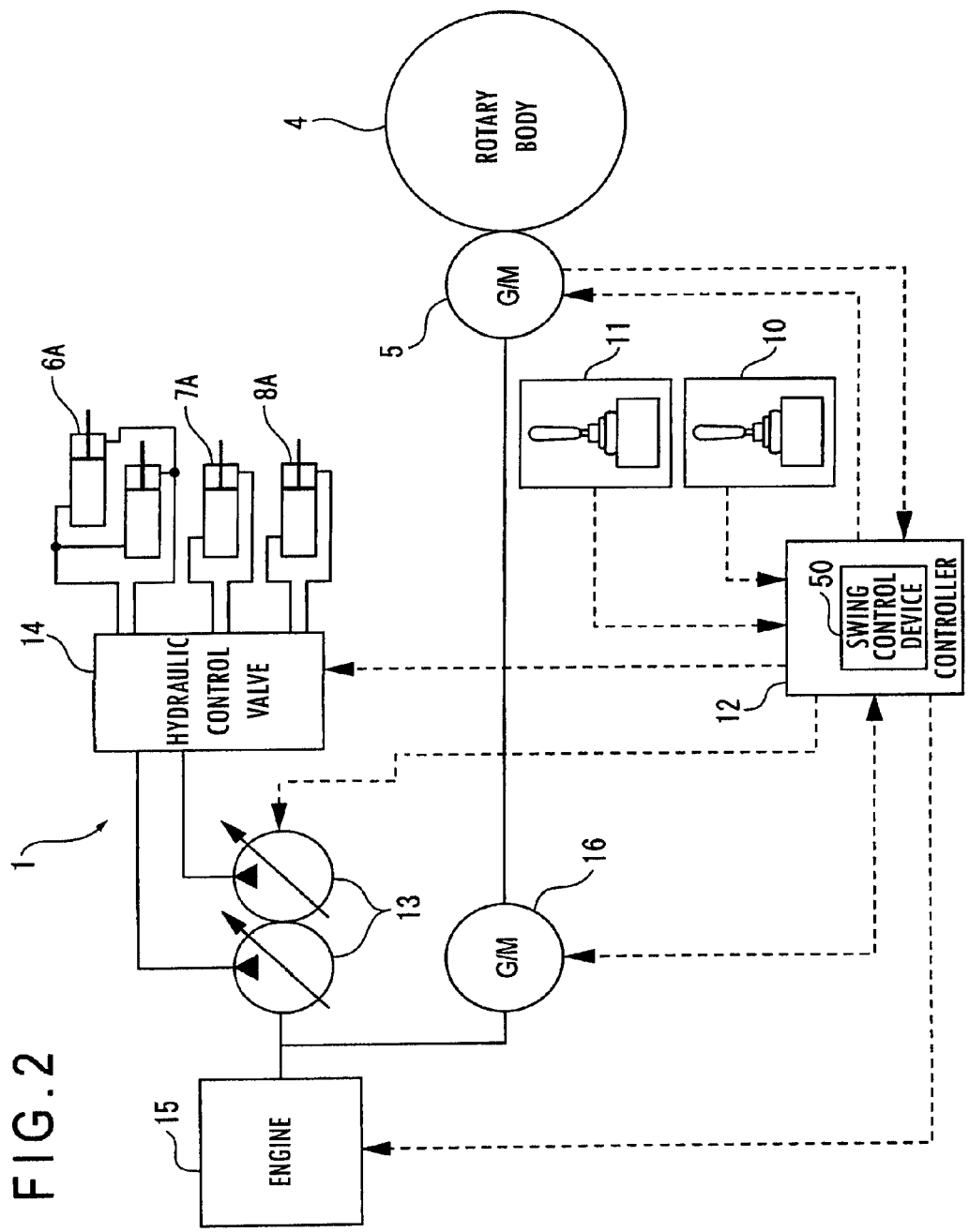
FIG. 2 is an illustration showing an overall arrangement of the construction machine according to the first embodiment.

FIG. 1 is a plan view showing an electric rotary excavator 1 (construction machine) according to this embodiment, and FIG. 2 is an illustration showing an overall arrangement of the electric rotary excavator 1.

In FIG. 1, the electric rotary excavator 1 includes a rotary body 4 which is mounted on a track frame of a base carrier 2 via a swing circle 3, and the rotary body 4 is rotated by an electric motor 5 which is engaged with the rotary body 4 via the swing circle 3 and a swing machinery (decelerator) (not shown). A power source for the electric motor 5 is a generator motor 16 (see FIG. 2) mounted on the rotary body 4, the generator motor driven by an engine 15 (see FIG. 2).

As shown in FIG. 2, the rotary body 4 is provided with a boom 6, an arm 7, and bucket 8, which are respectively activated by hydraulic cylinders 6A, 7A, and 8A, and the components 6, 7, and 8 constitute a work equipment 9. A hydraulic source of each hydraulic cylinder 6A, 7A, and 8A is a hydraulic pump 13 driven by the engine 15. Accordingly, the electric rotary excavator 1 is a hybrid construction machine including the hydraulically-driven work equipment 9 and the electrically-driven rotary body 4. However, for a construction machine according to the present invention, an electrically-driven construction machine may be used, in which even a hydraulic pump providing a hydraulic source of a work equipment is driven by electric motors. In such a case, a power for each electric motor can be supplied from an external commercial power supply through a power cable.

In FIG. 2, the electric rotary excavator 1 also has a swing lever 10, a work equipment lever 11, a controller 12, and a hydraulic control valve 14, in addition to the components described above.

The swing lever 10 and the work equipment 11 output to the controller 12 a lever signal in accordance with the tilting angle. 1 The controller 12, in accordance with a lever signal value of the work equipment lever 11, issues a command to the hydraulic pump 13 and the hydraulic control valve 14 driving the hydraulic cylinders 6A, 7A, and 8A to control the drive of the work equipment 9. If necessary, the controller 12 also issues commands to the engine 15 for adjusting an engine rotation number and to the generator motor 16 for adjusting an electricity to be generated.

Furthermore, the controller 12 controls the rotation of the rotary body 4 by controlling a torque output of the electric motor 5. The controller 12 includes a swing control device 50 for this purpose, and the rotation device 50 generates a final torque command value for the electric motor 5 based on the lever signal value of the swing lever 10 and a measured velocity Vact (see FIG. 3) of the electric motor 5 detected by a rotation velocity sensor (not shown). The torque command value is output to an inverter (not shown), and the inverter converts the torque command value into a current value and a voltage value to control the electric motor 5 to be driven at a target velocity.

[1-2] Controlling Structure by Swing Control Device 50

Now, a controlling structure by the swing control device 50 will be explained.

Figure 3:
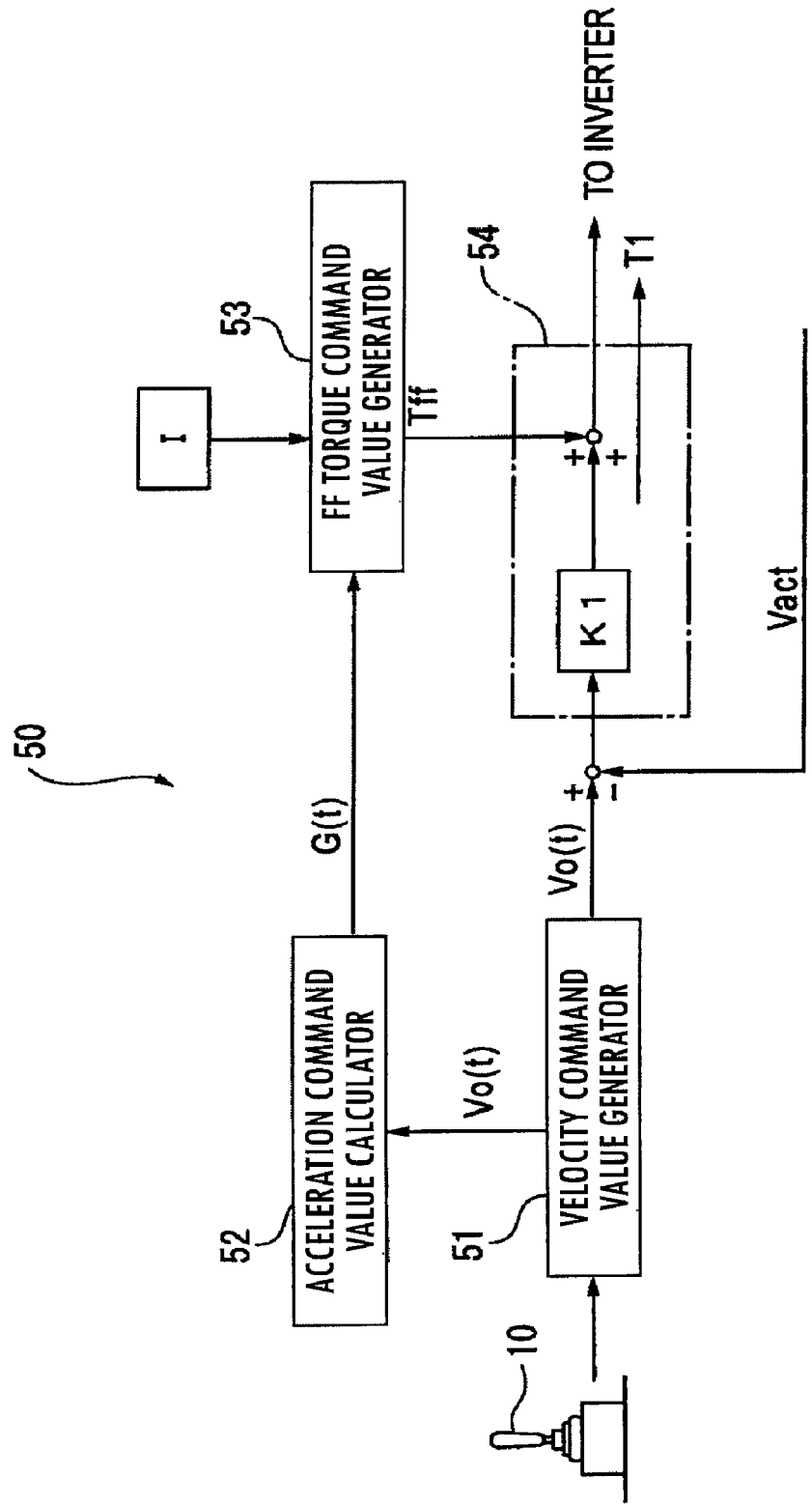
FIG. 3 is an illustration explaining a swing control device according to the first embodiment.

The swing control device 50 in this embodiment, as shown in FIG. 3, includes a velocity command value generating means 51, an acceleration command value calculating means 52, an FF (feed-forward) torque command value generating means 53, and a torque command value generating means 54.

The velocity command value generating means 51 generates a velocity command value Vo(t) for the electric motor 5, based on the lever signal of the swing lever 10. Specifically, the velocity command value generating means 51 generates the velocity command value Vo(t) by generating a lever command velocity value corresponding to the lever signal value, filter-processing the lever command velocity value and limiting the change amount. It should be noted that the lever signal and the lever command velocity value are in a proportional relationship in this embodiment.

The acceleration command value calculating means 52 calculates an acceleration command value G(t) based on the velocity command value Vo(t) generated by the velocity command value generating means 51. The acceleration command value calculating means 52 has a function to differentiate the velocity command value Vo(t), and calculates through the differentiation an acceleration command value G(t) to be output to the feed-forward torque command value generating means 53.

The feed-forward torque command value generating means 53 generates an feed-forward torque command value Tff by multiplying the input acceleration command value G(t) by a preset value of predetermined inertia moment I. Specifically, the feed-forward torque command value Tff represents a torque that is necessary to accelerate the rotary body 4, the value estimated from changes in the velocity command value Vo(t) based on the lever signal value of the swing lever 10. Accordingly, the feed-forward torque command value Tff is not basically a value changed by effects of a disturbance. It should be noted that the feed-forward torque command value generating means 53 also has a function to determine whether the absolute value of the acceleration command value G(t) is larger than a predetermined value, and the determined result is also referenced in generating the feed-forward torque command value Tff.

The torque command value generating means 54 generates the final torque command value based on the velocity command value Vo(t) generated by the velocity command value generating means 51, the measured velocity Vact fed back from the electric motor 5, and the feed-forward torque command value Tff generated by the feed-forward torque command value generating means 53. At that time, the torque command generating means 54 carries out the following two processes.

As a first process, the torque command value generating means 54 multiplies by a velocity gain K1 a deviation between the velocity command value Vo(t) and the measured velocity Vact to generate a first torque command value T1. It should be noted that the velocity gain K1 is much smaller than a value used in a conventional electric rotary excavator, and that the velocity gain K1 is set so that the movement of the rotary body 4 is easily affected by a disturbance or the like.

As a second process, the torque command value generating means 54 adds to the first torque command value T1 the feed-forward torque command value Tff generated by the feed-forward torque command value generating means 53 to generate a second torque command value T2. Accordingly, the absolute value of the second torque command value T2 is larger than that of the first torque command value T1. The same is true in the other embodiments described later.

Figure 4:
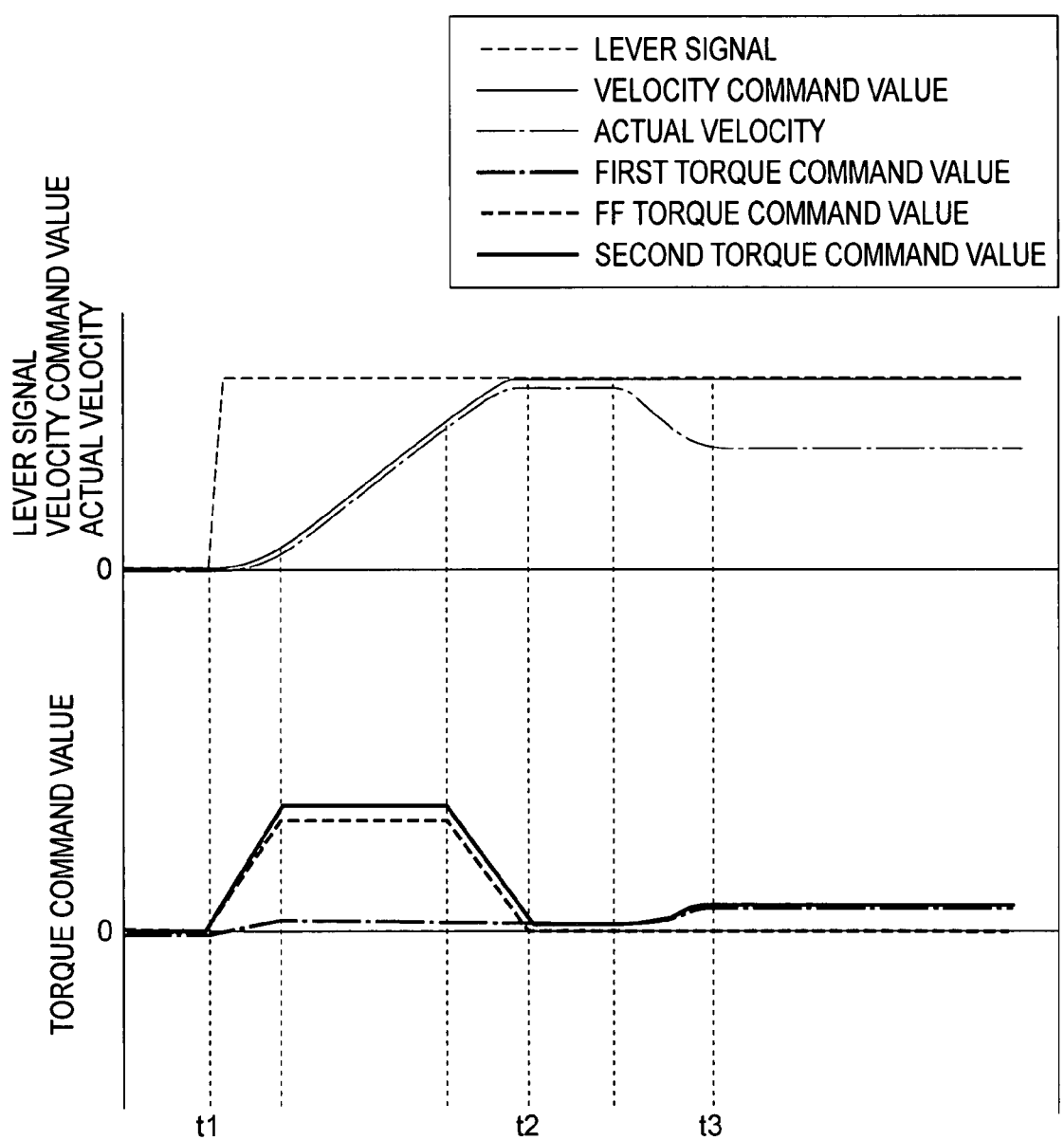
FIG. 4 is an illustration explaining a swing control method according to the first embodiment.

As shown in FIG. 4, when the operational amount of the swing lever 10 is maintained at a constant level (t2) so as to rotate the rotary body 4 at a constant velocity, the velocity command value Vo(t) becomes constant. In this case, since the acceleration command value G(t) calculated by the acceleration command value calculating means 52 is "0 (zero)", the feed-forward torque command value Tff also becomes 0 so that nothing is added to the first torque command value T1. Accordingly, during the rotation at a constant velocity, as shown in FIG. 3, only the small first torque command value T1 is output as the final torque command value to drive the electric motor 5, so that the rotation of the rotary body 4 is controlled.

Referring back to FIG. 4, when the boom 6 and the arm 7 are operated while the rotary body 4 is rotated at a constant velocity as described above (see FIG. 1), a posture of the electric rotation excavator 1 changes, which also changes the inertia moment of the rotary body 4 including the boom 6 and the arm 7. Then, the rotary body 4 being rotated at the small first torque command value T1 is easily affected by such a disturbance as the change of the inertia moment. When, for example, the boom 6 is lowered and the arm 7 is extended during the rotation at a constant velocity, the inertia moment is increased thereby affecting the rotary body 4 to decrease the velocity (t3). Conversely, when the boom 6 is raised and the arm 7 is retracted, the inertia moment is decreased, thereby increasing the velocity.

Figure 5:
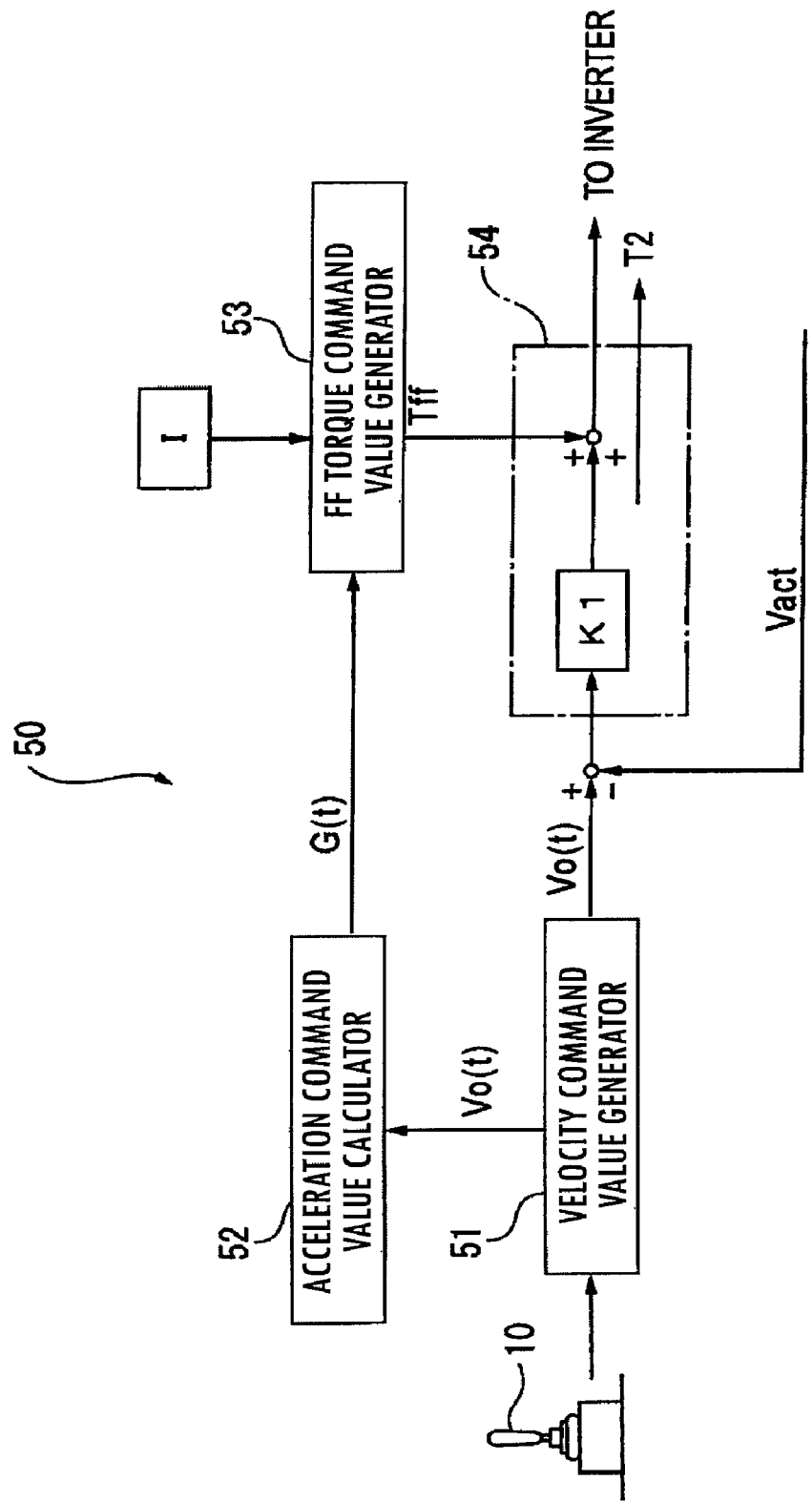
FIG. 5 is another illustration explaining the swing control device according to the first embodiment.

On the other hand, when tilting the swing lever 10 for acceleration (t1), or shifting back the lever into neutral position for deceleration or for stop, the velocity command value Vo(t) is changed in accordance with the operational amount of the swing lever 10, and an acceleration command value G(t) arises based on this variation. Then, an feed-forward torque command value Tff in accordance with the acceleration command value G(t) is generated and added to the first torque command value T1, so that a large second torque command value T2 is generated. In this case, as shown in FIG. 5, the second torque command value T2 is output as the final torque command value, so that when the swing lever 10 is operated, the drive of the electric motor 5 is controlled by a torque command value large enough to rotate the rotary body 4 in accordance with a velocity command value Vo(t) at that time.

[1-3] Flow to Generate Torque Command Value in Swing Control Device 50

Figure 6:
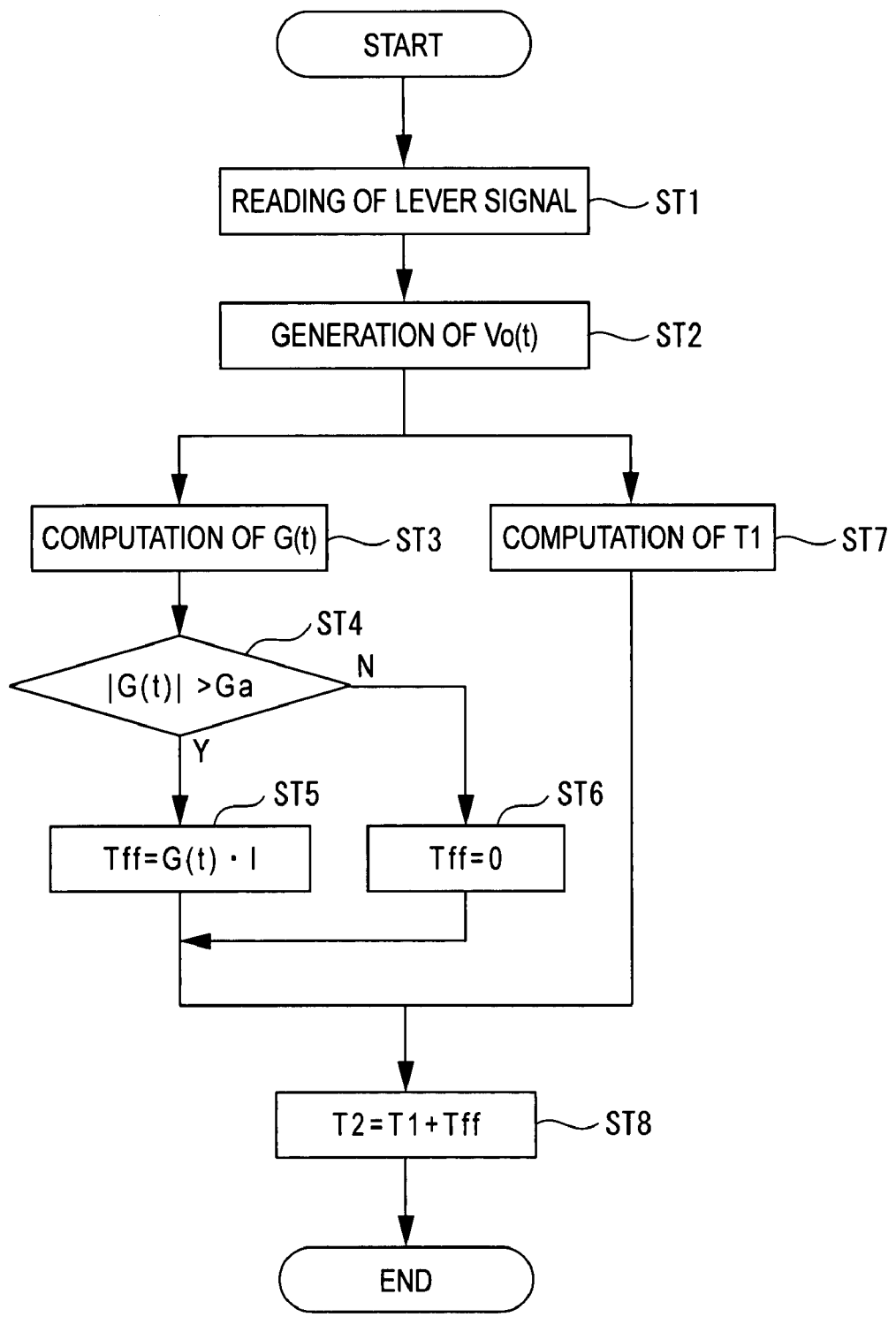
FIG. 6 is a flowchart explaining a method for calculating a torque command value in the first embodiment.

Now, with reference to FIG. 6, a flow to generate the first torque command value T1 and the second torque command value T2 will be explained.

After the swing control device 50 reads a lever signal value (ST1), the velocity command value generating means 51 generates a velocity command value Vo(t) based on the lever signal value (ST2).

Then, the acceleration command value calculating means 52 computes an acceleration command value G(t) by differentiating the velocity command value Vo(t) (ST3).

The feed-forward torque command value generating means 53 generates an feed-forward torque command value Tff using the acceleration command value G(t) and inertia moment I. Specifically, the feed-forward torque command value generating means 53 first determines the absolute value of the acceleration command value G(t) (ST4). When the absolute value of the acceleration command value G(t) is larger than a predetermined value, the value of the acceleration command value G(t) is multiplied as it is by the inertia moment I to compute the feed-forward torque command value Tff (ST5). When the absolute value of the acceleration command value G(t) is equal to or less than the predetermined value, the feed-forward torque command value Tff is set to zero (ST6).

On the other hand, the torque command value generating means 54 multiplies by a velocity gain K1 the deviation between the velocity command value Vo(t) and the measured velocity Vact to generate a first torque command value T1 (ST7). Then, the torque command value generating means 54 adds to the first torque command value T1 the feed-forward torque command value Tff generated by the feed-forward torque command value generating means 53 to generate a second torque command value T2 (ST8).

[1-4] Advantage of Embodiment

According to this embodiment, the following advantage can be obtained:

Specifically, the swing control device 50 of the electric rotary excavator 1 generates the final torque command value including the first torque command value T1 computed using the small velocity gain K1. With the arrangement, for example, when a disturbance capable of changing inertia moment of the whole rotary body 4 is applied thereto while the rotary body 4 is rotated at a constant velocity with velocity command value Vo(t), the change in the inertia moment affect the rotation velocity of the rotary body 4. Accordingly the rotation velocity can be changed in accordance with the extension and retraction of the boom 6 and the arm 7. Thus, the operator can perform the rotation operation as in the hydraulically-driven excavator.

Conversely, when operating the swing lever 10 to change the velocity command value Vo(t) for acceleration, the large second torque command value T2 controls the rotation of the rotary body 4. Thus, a good and quick operational feeling is obtained without a delay in acceleration or deceleration, and the degradation of workability can be avoided.

Second Embodiment

Figure 7:
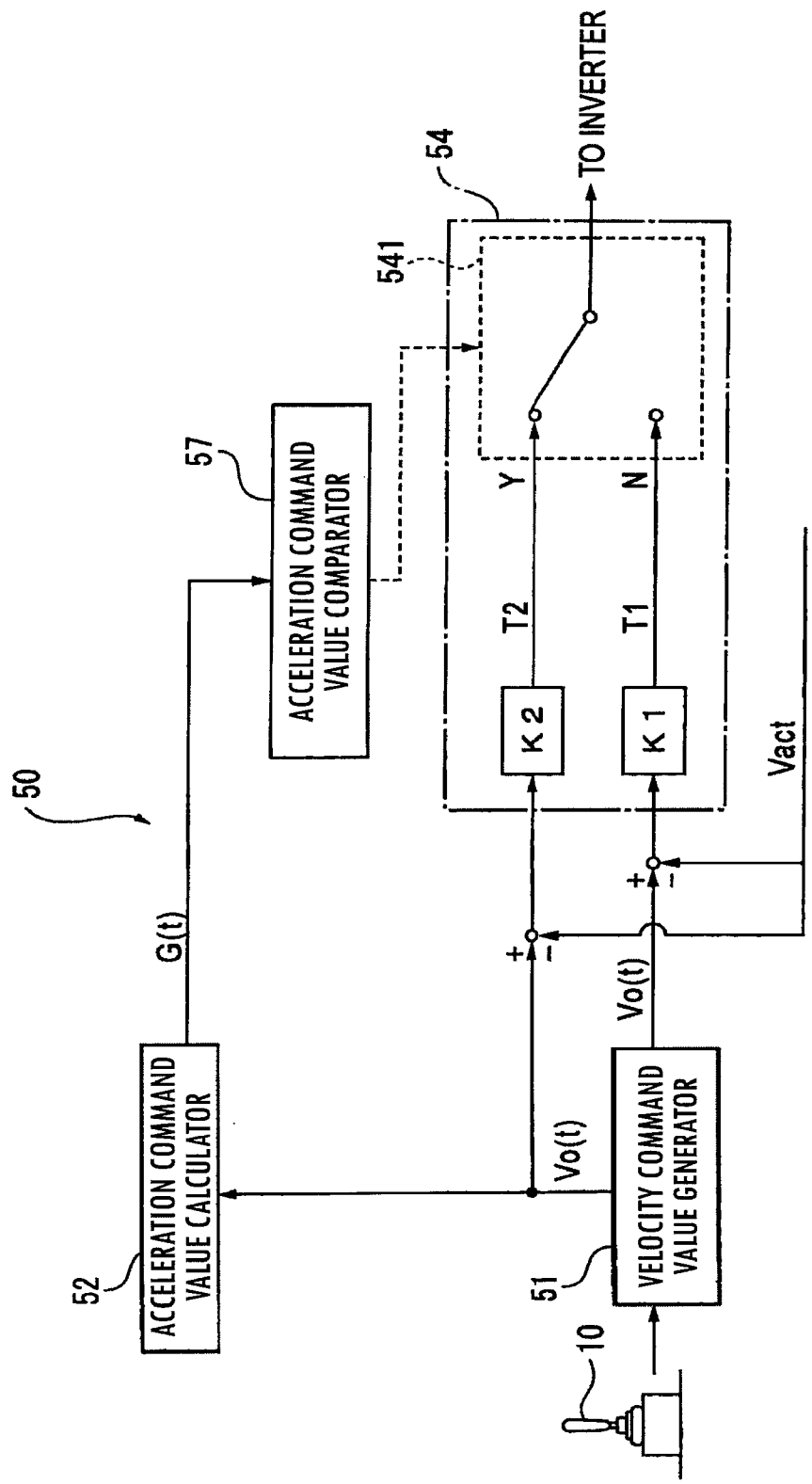
FIG. 7 is an illustration explaining a swing control device according to a second embodiment.

A swing control device 50 according to a second embodiment of the present invention will be described below with reference to FIG. 7.

In the first embodiment described above, the swing control device 50 includes the feed-forward torque command value generating means 53. In addition, the torque command value generating means 54 generates the second torque command value by adding the feed-forward torque command value Tff to the first torque command value T1, and either the first torque value T1 or the second torque value T2 is set as the final torque command value.

In contrast, the present embodiment is greatly different from the first embodiment is in that a swing control device includes an acceleration command value comparing and determining means 57 in place of the feed-forward torque command value generating means 53, and that the torque command value generating means 54 switches the final torque command value between the first torque command value T1 and the second torque command value T2 based on a comparison result of the acceleration command value comparing and determining means 57.

Specifically, in this embodiment, the acceleration command value comparing and determining means 57 compares the absolute value of the acceleration command value G(t) with a predetermined value.

The torque command value generating means 54 multiplies by the velocity gain K1 of a small value the deviation between the velocity command value Vo(t) and the measured velocity Vact to generate the first torque command value T1. Besides the first torque command value T1, The torque command value generating means 54 multiplies the deviation by the velocity gain K2 of a large value to generate the second torque command value T2. It should be noted that as in the first embodiment, the control law herein is velocity control to output a torque command value in accordance with a deviation between the velocity command value and the measured velocity, which is proportional control.

Now, when rotating the rotary body 4 at a substantially constant velocity, the change rate of the velocity command value Vo(t) is small, and the acceleration command value G(t) also becomes small accordingly. Hence, the acceleration command value comparing and determining means 57 determines that the acceleration command value G(t) is equal to or less than the predetermined value. Then, the torque command value generating means 54 switches a switch 541 to "N" side based on the determination result of the acceleration command value comparing and determining means 57 to output to the inverter the small first torque command value T1 as the final torque command value.

In contrast, when the rotary body 4 is accelerated to a certain degree, the change rate of the velocity command value Vo(t) is large, and the acceleration command value comparing and determining means 57 determines that the acceleration command value G(t) exceeds the predetermined value. Accordingly, the torque command value generating means 54 switches the switch 541 to "Y" side. In sum, the torque command value generating means 54 outputs the large second torque command value T2 to the inverter as the final torque command value.

According to the embodiment, when the rotary body 4 is rotated at a constant velocity with the velocity command value Vo(t) fixed, the rotation of the rotary body 4 is controlled by the first torque command value T1 that is generated using the small velocity gain K1. Accordingly, if a disturbance capable of changing inertia moment of the whole rotary body 4 is applied, the inertia moment change affects the rotation velocity of the rotary body 4. Thus the swing control device 50 can change the rotation velocity in accordance with the extension and retraction of the boom 6 and the arm 7.

In contrast, when operating the swing lever 10 for acceleration, the rotation of the rotary body 4 is controlled by the second torque command value T2 that is generated using the large velocity gain K2. Therefore, an operation with a good responsiveness can be realized.

Furthermore, the switch between the first and second torque command values T1 and T2 is performed based on the comparison of the predetermined value with the absolute value of the acceleration command value G(t). With this arrangement, when, for example, the swing lever 10 is tilted at one push, the absolute value of the acceleration command value G(t) instantly exceeds the predetermined value, thereby allowing the rotation by the large second torque command value from the beginning of the rotation. Hence, the rotating state of the rotary body 4 can be well responsive to the movement of the swing lever 10, which can reliably realize a sudden rotation or the like. The same is true in a case of a sudden stop where the swing lever 10 is shifted back into the neutral position at one push.

Third Embodiment

A swing control device 50 according to a third embodiment of the present invention will be described below with reference to FIGS. 8 and 9.

In the first embodiment described above, the feed-forward torque command value generating means 53 is provided, while in the second embodiment the acceleration command value comparing and determining means 57 is provided, whereby the torque command value is generated or switched based on the acceleration command value G(t).

On the other hand, this embodiment is greatly different from the first embodiment in that the velocity command value Vo(t) is changed based on the acceleration command value G(t). The velocity gain K1 in this embodiment is a small value as in the first embodiment.

Figure 8:
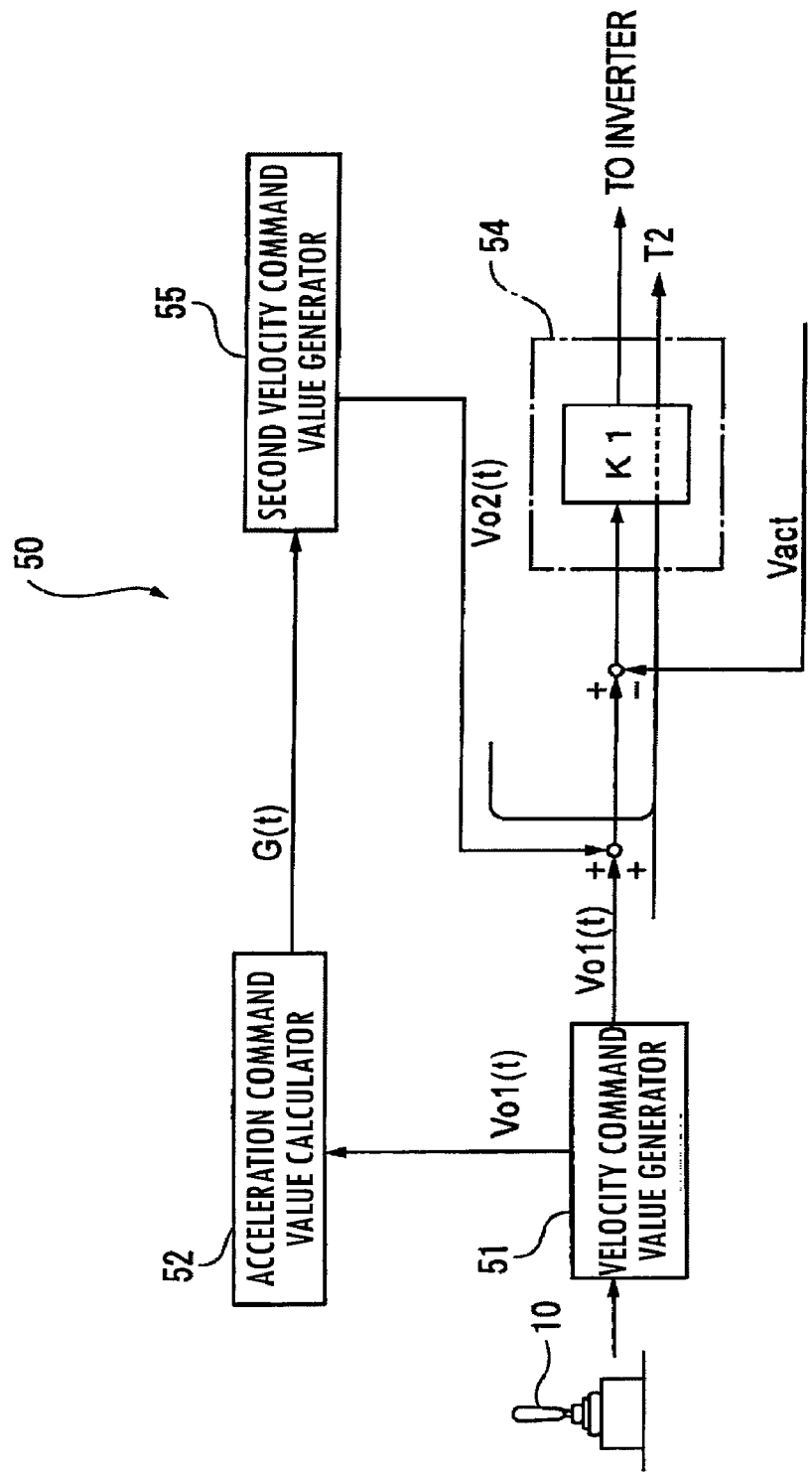
FIG. 8 is an illustration explaining a swing control device according to a third embodiment.

For this purpose, the swing control device 50 according to this embodiment, as shown in FIG. 8, includes a second velocity command value generating means 55 in addition to the first velocity command value generating means 51 arranged similarly to the velocity command value generating means of the first embodiment. The second velocity command value generating means 55 generates a second velocity command value $V_o2(t)$ with a predetermined algorithm based on the acceleration command value G(t) calculated by the acceleration command value calculating means 52.

Now, when operating the operation lever 10 to accelerate the rotary body 4, the acceleration command value G(t) gains a value (including a negative value in a case of deceleration), so that the second velocity command value $V_o2(t)$ also has a value. Then, an addition of the second velocity value command $V_o2(t)$ to the first velocity command value $V_o1(t)$ generates a velocity command value Vo(t). Based on the velocity command value Vo(t) obtained by the addition, a large second torque command value T2 is generated.

Figure 9:
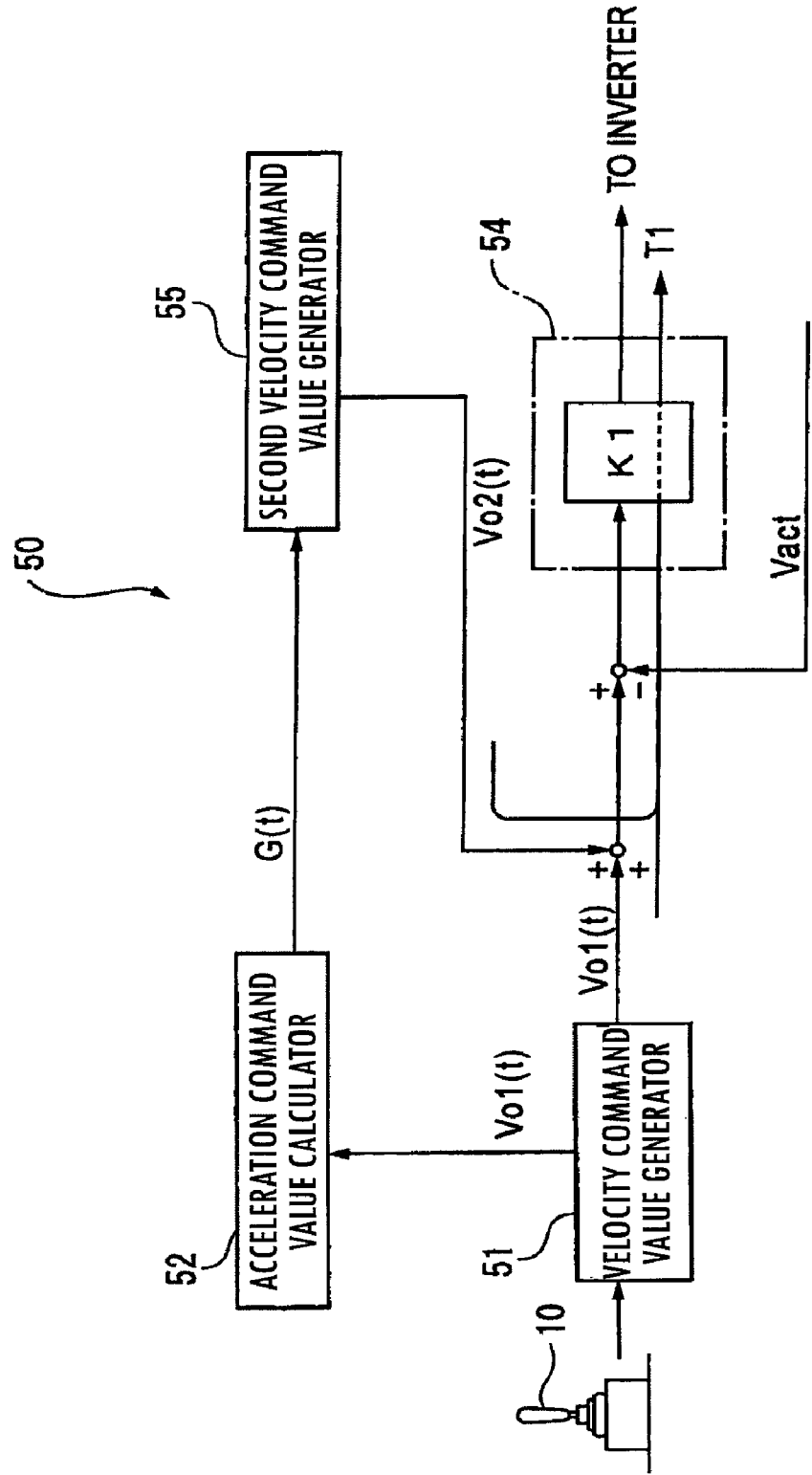
FIG. 9 is another illustration explaining the swing control device according to the third embodiment.

It should be noted that as shown in FIG. 9, in a case of a rotation at a constant velocity with no acceleration, no acceleration command value G(t) is generated, so that a small first torque command value T1 is generated solely based on the first velocity command value $V_o1(t)$.

This embodiment can also provide advantages substantially same as those of the first embodiment, despite the difference in the arrangement.

Fourth Embodiment

A swing control device 50 according to a fourth embodiment of the present invention will be described below with reference to FIGS. 10 and 11.

In the first embodiment described above, the feed-forward torque command value Tff is generated via the acceleration command value G(t) based on the lever signal from the swing lever 10. In addition, the torque command generating means 54 uses the velocity gain K1 of the small value.

In contrast, in this embodiment, major differences from the first embodiment are that the feed-forward torque command value Tff is generated via a work equipment velocity command value $V_{WO}(t)$ based on a lever signal from a work equipment lever 11 (for operating the boom 6 in FIG. 1, for example), and that only the large velocity gain K2 is used in a torque command value generating means 54.

Figure 10:
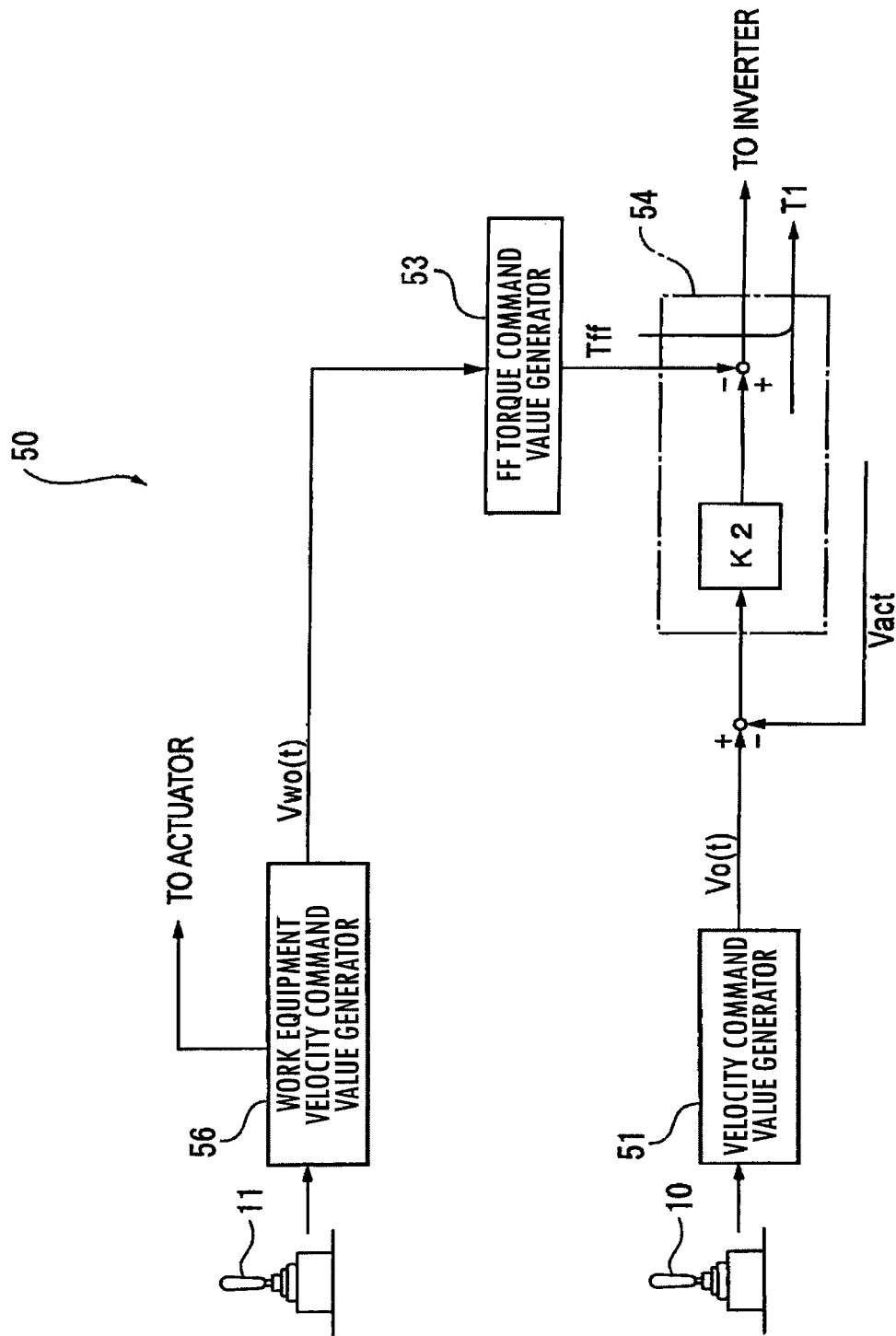
FIG. 10 is an illustration explaining a swing control device according to a fourth embodiment.
Figure 11:
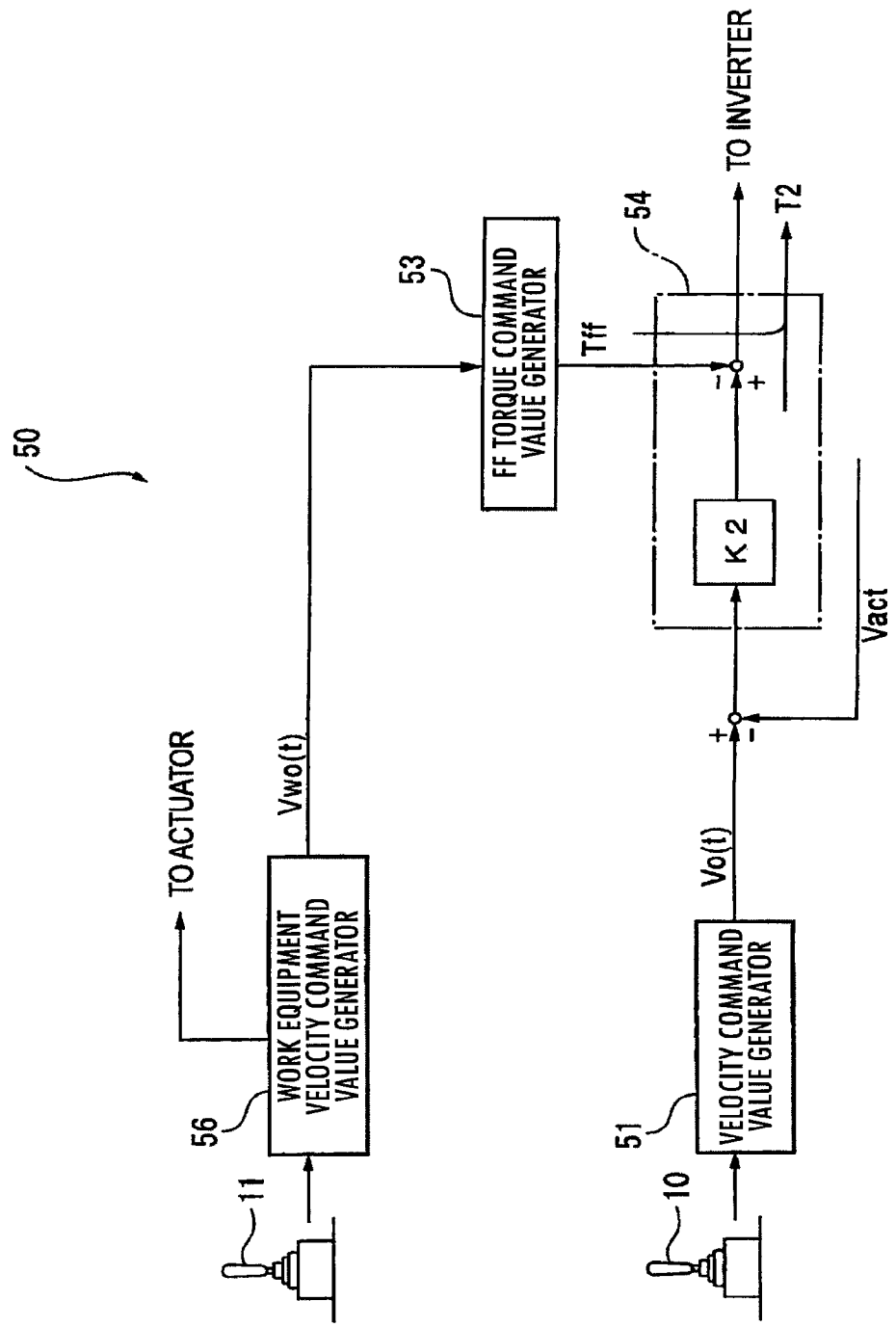
FIG. 11 is another illustration explaining the swing control device according to the fourth embodiment.

For this purpose, the swing control device 50 according to this embodiment, as shown in FIG. 10, includes a work equipment velocity command value generating means 56. The work equipment command value generating means 56 generates and outputs to an feed-forward torque command value generating means 53 the machine velocity command value $V_{WO}(t)$ based on the lever signal from the work equipment lever 11. It should be noted that the work equipment velocity command value $V_{WO}(t)$ is a signal output to an actuator side of, for instance, the hydraulic cylinders operating the boom 6 and the arm 7.

A torque command value generating means 54 according to this embodiment multiplies by a large velocity gain K2 the deviation between the velocity command value Vo(t) and the measured velocity Vact to generate a second torque command value T2.

In the present embodiment, when the inertia moment changed by operating the work equipment lever 11 to operate the boom 6 or the like is applied to the rotary body 4 (FIG. 1) as a disturbance, the feed-forward torque command value Tff is generated based on the work equipment velocity command value $V_{WO}(t)$ from the work equipment lever 11, and the feed-forward torque command value Tff is subtracted from the second torque command value T2 to generate the small first torque command value T1. Then, the first torque command value T1 is output to the inverter as the final torque command value. Specifically, the small first torque command value T1 drives the electric motor 5 (FIG. 1), and the change of the inertia moment affects the movement of the rotary body 4 (FIG. 1).

On the other hand, when the work equipment lever 11 is not operated, the inertia moment is not changed whereby no disturbance is applied to the rotary body 4. In this state, no work equipment velocity command value Vwo(t) from the work equipment lever 11 is generated, therefore no feed-forward torque command value Tff is generated. Thus, as shown in FIG. 11, nothing is subtracted from the second torque command value T2, and the large second torque command T2 is directly output to the inverter as the final torque command value. Accordingly, by driving the electric motor 5 by the large second torque command value T2, the rotary body 4 can be rotated with a good responsiveness.

Accordingly, in the present embodiment, despite the difference of the arrangement, the rotation velocity of the rotary body can be changed in accordance with a disturbance, and a good operational feeling and workability during normal operations can be maintained. Thus the present embodiment can also achieve the object of the present invention.

Fifth Embodiment

A swing control device 50 according to a fifth embodiment of the present invention will be described below with reference to FIG. 12.

In the second embodiment described above, the acceleration command value calculating means 52 computes the acceleration command value G(t) from the velocity command value Vo(t) generated based on the lever signal from the swing lever 10, and the acceleration command value comparing and determining means 57 determines the magnitude of the absolute value of the acceleration command value G(t) to switch the final torque command value between the first torque command value T1 and the second torque command value T2.

Figure 12:
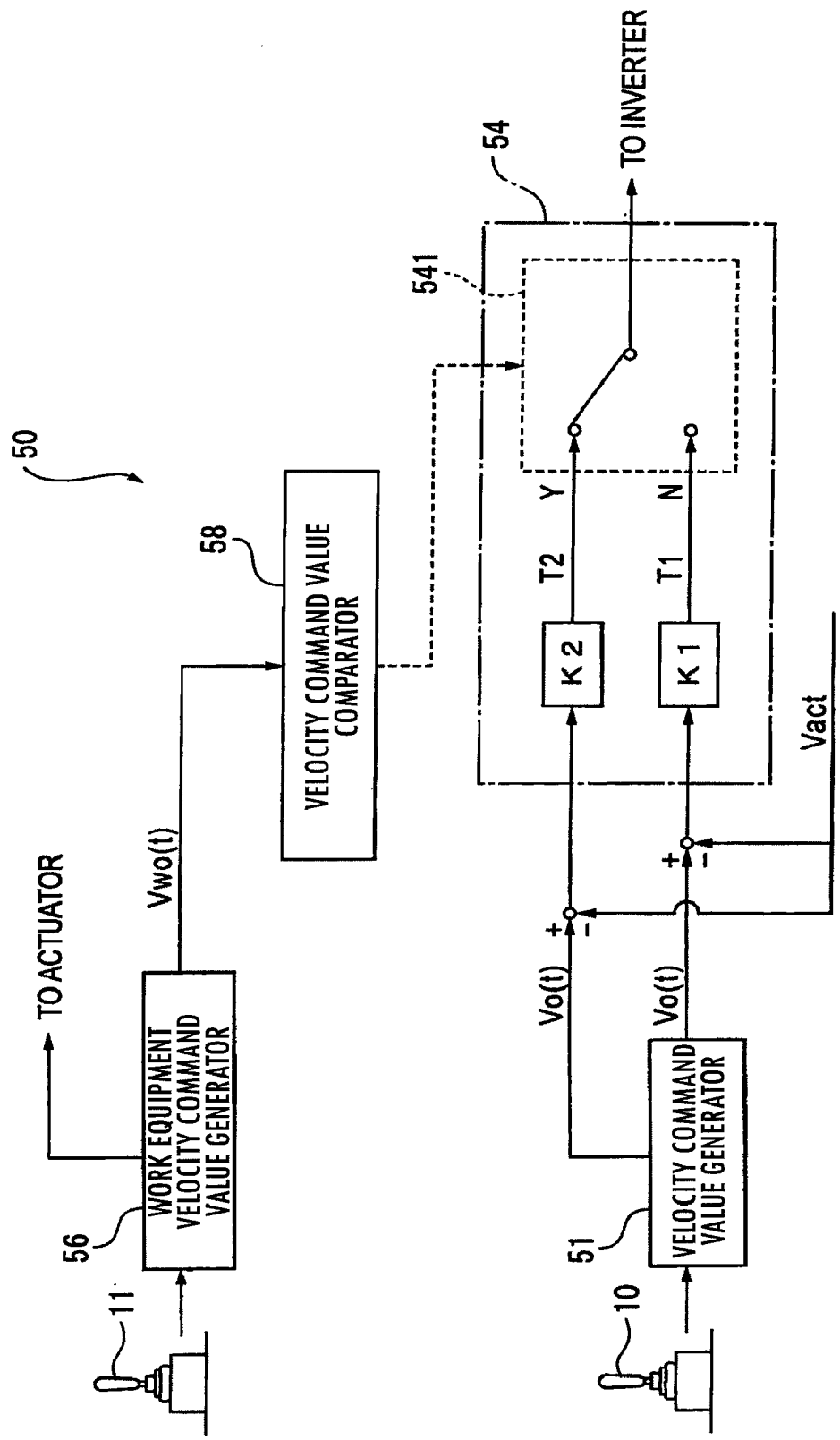
FIG. 12 is an illustration explaining a swing control device according to a fifth embodiment.

In contrast, as shown in FIG. 12, the present embodiment is different from the second embodiment in that the magnitude of the absolute value of the machine velocity command value $V_{WO}(t)$ generated based on a lever signal from the work equipment lever 11 is determined, so that the final torque command value is switched between each torque command value T1 and T2.

For this purpose, the swing control device 50 according to this embodiment includes a work equipment velocity command value generating means 56 and a velocity command value comparing and determining means 58. The other arrangement is substantially the same as that of the second embodiment.

The work equipment velocity command value generating means 56 generates the work equipment velocity command value $V_{WO}(t)$ based on the lever signal from the work equipment 11, while the velocity command value comparing and determining means 58 determines the magnitude of the absolute value of the work equipment velocity command value $V_{WO}(t)$ A torque command value generating means 54 according to this embodiment switches a switch 541 based on the determination result of the velocity command value comparing and determining means 58.

Specifically, when the work equipment 9 not operated, the velocity command value comparing and determining means 58 determines that the absolute value of the work equipment velocity command value $V_{WO}(t)$ from the work equipment lever 11 is equal to or less than a predetermined value. In this case, the inertia moment is hardly changed (i.e., a disturbance is hardly applied to the rotary body 5). Thus, the switch 541 is switched to "Y" side, so that the large second torque command value T2 generated using the velocity gain K2 is output as the final torque command value. Then, the electric motor 5 (FIG. 1) is driven by the second torque command value, which realizes a rotation that is well responsive and not affected by a disturbance.

Conversely, when the work equipment 9 is operated, the velocity command value comparing and determining means 58 determines that the absolute value of the work equipment velocity command value $V_{WO}(t)$ from the work equipment lever 11 exceeds the predetermined value. In this case, the inertia moment is changed (i.e., a great disturbance is applied). Thus, the switch 541 is switched to "N" side, so that the small first torque command value T1 generated using the velocity gain K1 is output as the final torque command value. Accordingly, the rotation velocity can change in accordance with the disturbance.

This embodiment can also achieve the object of the present invention, despite the difference in the arrangement. The following advantage is also obtained.

Specifically, since the switch between the first and second torque command values T1 and T2 is performed based on the comparison of the predetermined value with the absolute value of the work equipment velocity command value $V_{WO}(t)$ from the work equipment lever 11, even when slightly extending or retracting the boom 6 and the arm 7, the absolute value of the work equipment velocity command value $V_{WO}(t)$ becomes equal to or less than the predetermined value, so that the rotary body 4 can rotate with the large second torque command value T2 well responsively. It is advantageous in smoothly moving the boom 6 and the arm 7 during the rotation and precisely positioning the tooth edge of the bucket 8 at any position of the rotating direction. Thus it is specifically effective when the work equipment lever 11 is slightly operated (fine control).

Sixth Embodiment

Figure 13:
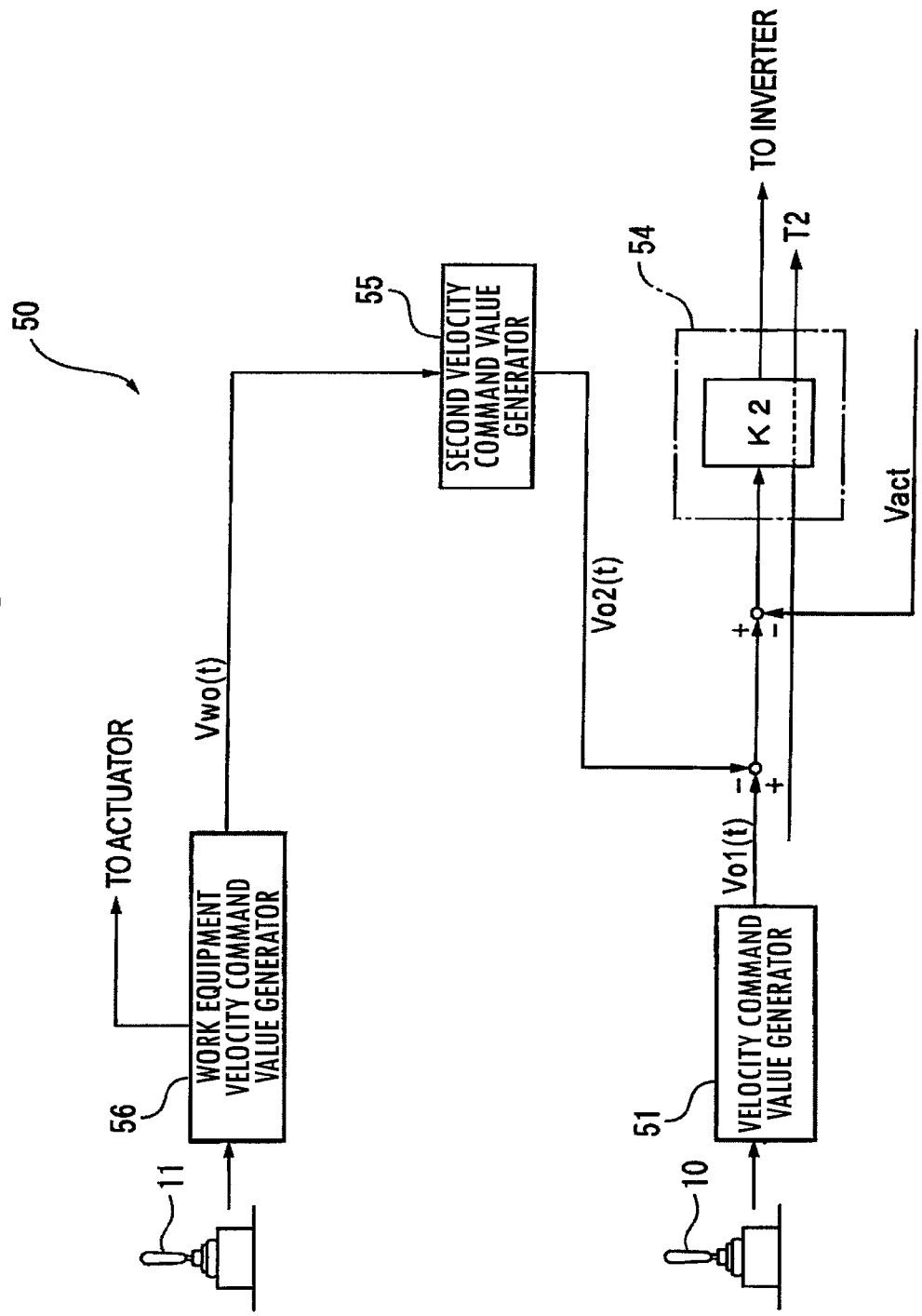
FIG. 13 is an illustration explaining a swing control device according to a sixth embodiment.
Figure 14:
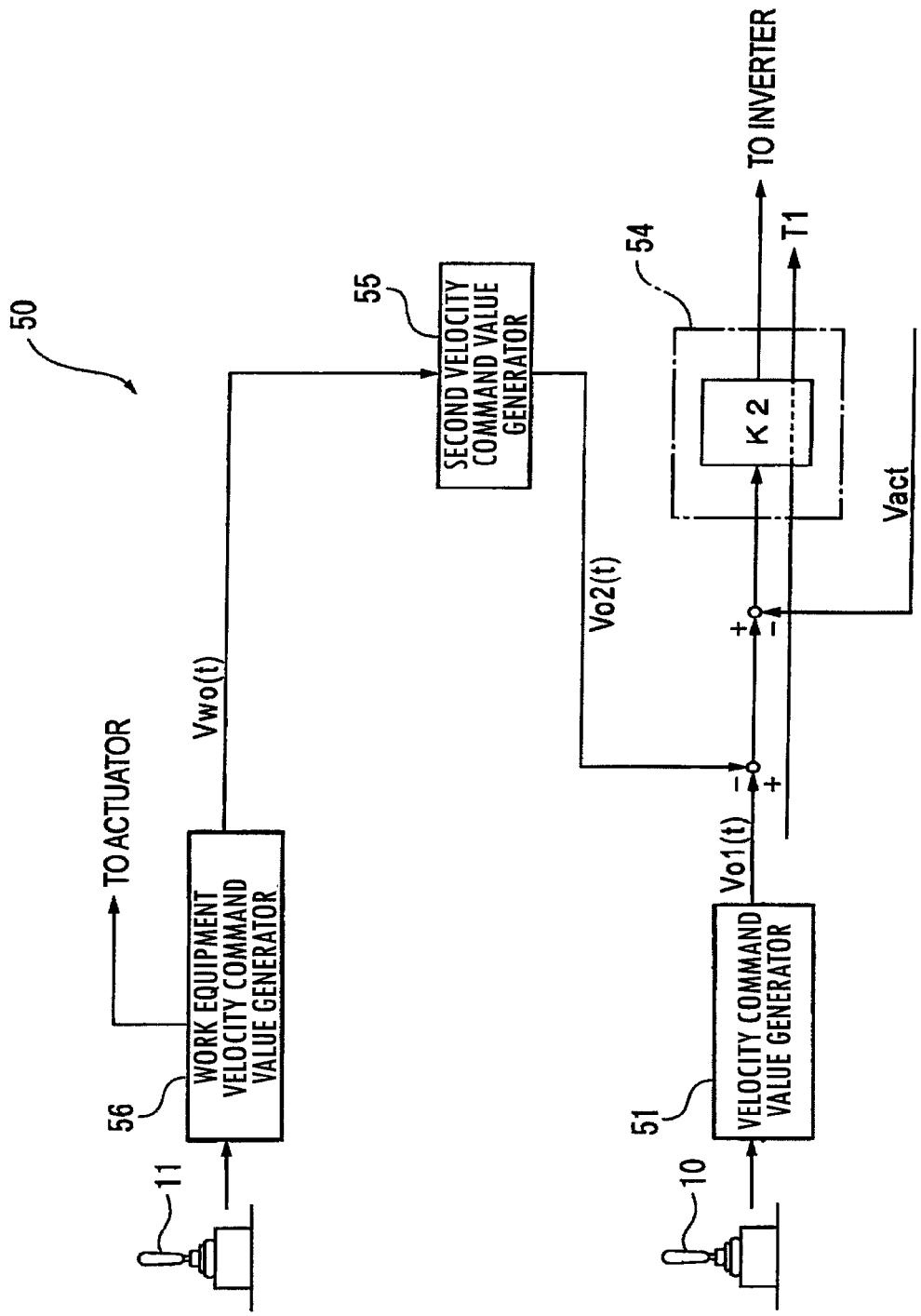
FIG. 14 is another illustration explaining the swing control device according to the sixth embodiment.

A swing control device 50 according to a sixth embodiment of the present invention will be described below with reference to FIGS. 13 and 14.

In the third embodiment described above, the acceleration command value G(t) is computed using the velocity command value Vo(t) generated based on the lever signal from the swing lever 10, and the second velocity command value $V_0 2$ (t) is generated based on the acceleration command value G(t). In addition, the torque command generating means 54 uses the velocity gain K1 of the small value.

In contrast, this embodiment is different from the third embodiment in that the second velocity command value $V_0 2$ (t) is generated based on the work equipment velocity command value $V_{WO}(t)$ from the work equipment lever 11, and that the large velocity gain K2 is used by the torque command value generating means 54.

In the present embodiment, when the work equipment 9 is not operated and the inertia moment is not changed, no value of the work equipment velocity command value $V_{WO}(t)$ is input to the second velocity command value generating means 55, so that the second velocity command value $V_0 2(t)$ has no value. Accordingly, nothing is subtracted from the first velocity command value $V_0 1(t)$, and the large second torque command value T2 is generated using the large velocity gain K2. Then, the electric motor 5 (FIG. 1) is driven by the second torque command value, which realizes a rotation that is well responsive and not affected by a disturbance.

Conversely, when the work equipment 9 is operated and the inertia moment is changed, the second velocity command value $V_0 2(t)$ is generated from the work equipment velocity command value $V_{WO}(t)$ of a value from the work equipment lever 11, then the second velocity $V_0 2(t)$ is subtracted from the first velocity command value $V_0 1(t)$. Accordingly, although the large velocity gain K2 is used, the small first torque command value T1 is generated to be output as the final torque command value. Thus, the rotation velocity can change in accordance with the disturbance.

The present embodiment can also provide an advantage similar to that of the fourth embodiment and achieve the object of the present invention in spite of the difference in the arrangement.

It should be noted that although the best configuration, method, and the like for implementing the present invention have been disclosed above, the present invention is not limited to the best configuration.

In the fourth to sixth embodiments, the "disturbance applied to the rotary body" is exemplified by a change in the inertia moment generated in the rotary body 4 by the extension and retraction of the boom 6 and arm 7, but the present invention is not limited thereto.

For example, when the bucket 8 or the like collide with a large rock etc during the rotation of the rotary body 4 and the rotation is impeded, a sudden load is applied to the electric motor 5. The motor suddenly outputs a large force opposing such an external force, and the operator receives a large impact. Such an external force is also included in the "disturbance applied to the rotary body" in the present invention.

In this case, for instance, whether an external force (disturbance) is being applied is determined by reference to the deviation between the velocity command value and the measured velocity. If the external force is determined to be being applied, the electric motor 5 is driven with the small first torque command value.

Since the rotation of the rotary body 4 is prone to be affected by the external force, the impact caused by the action of the external force is absorbed by a slow rotation of the rotary body 4 itself, whereby the ride comfort can be improved.

In addition, it should be noted that, while the present invention has been described and explained with reference to the specific embodiment and the drawings thereof, various modifications to the shape, quantity, and other detailed arrangement may be made to the described embodiment by those of ordinary skill in the art without departing from the spirit and the scope of the object of the invention.

Accordingly, the above-disclosed shape, quantity and the like are merely described as examples for easy understanding of the present invention, so that the present invention is not limited thereto. The present invention shall include a description with names of components excluding a part or all of the limitation on the shape and quantity, etc.

INDUSTRIAL APPLICABILITY

The present invention is applicable to various types of swing control devices for controlling a rotary body rotated by an electric motor. It should be noted that a machine in which such a control device can be installed is not limited to a construction machine. In addition, a construction machine is not limited to an excavator as long as the machine includes a rotary body which is rotated by an electric motor.

What is claimed is:

1. A swing control device that controls a rotary body rotated by an electric motor, the swing control device comprising:
   a velocity command value generator that generates a velocity command value for the electric motor;
   an acceleration command value calculator that calculates an acceleration command value based on the velocity command value generated by the velocity command value generator;
   a feed-forward torque command generator that generates a feed-forward torque command value based on the acceleration command value calculated by the acceleration command value calculator; and
   a torque command value generator that:
      generates a first torque command value based on a deviation between the velocity command value generated by the velocity command value generator and a measured velocity of the rotary body;
      generates a second torque command value with a larger absolute value than the first torque command value by adding the feed-forward torque command value generated by the feed-forward torque command generator to the first torque command value generated by the torque command value generator; and
      outputs one of the first torque command value and the second torque command value.

2. A swing control device that controls a rotary body rotated by an electric motor, the swing control device comprising:
   a velocity command value generator that generates a velocity command value for the electric motor;
   an acceleration command value calculator that calculates an acceleration command value based on the velocity command value generated by the velocity command value generator;
   an acceleration command value comparator that compares the acceleration command value calculated by the acceleration command value calculator with a predetermined value; and
   a torque command value generator that:
      generates a first torque command value based on a deviation between the velocity command value generated by the velocity command value generator and a measured velocity of the rotary body;
      generates a second torque command value with a larger absolute value than the first torque command value based on the deviation between the velocity command value generated by the velocity command value generator and the measured velocity of the rotary body; and
      outputs one of the first torque command value and the second torque command value based on a determination result of the acceleration command value comparator.

3. A swing control device that controls a rotary body rotated by an electric motor, the swing control device comprising:
   a first velocity command value generator that generates a first velocity command value for the electric motor;
   an acceleration command value calculator that calculates an acceleration command value based on the first velocity command value generated by the first velocity command value generator;
   a second velocity command value generator that generates a second velocity command value based on the acceleration command value calculated by the acceleration command value calculator; and
   a torque command value generator that:
      generates a first torque command value based on a deviation between the first velocity command value generated by the first velocity command value generator and a measured velocity of the rotary body;
      generates a second torque command value with a larger absolute value than the first torque command value based on a deviation between a total velocity command value that is obtained by adding the second velocity command value to the first velocity command value, and a measured velocity of the rotary body; and
      outputs one of the first torque command value and the second torque command value.

4. A swing control device that controls a rotary body rotated by an electric motor, the swing control device comprising:

a velocity command value generator that generates a velocity command value for the electric motor;

a work equipment velocity command value generator that generates a work equipment velocity command value of a work equipment provided on the rotary body;

a feed-forward torque command generator that generates a feed-forward torque command value based on the work equipment velocity command value generated by the work equipment velocity command value generator; and a torque command value generator that:

generates a first torque command value by subtracting the feed-forward torque command value generated by the feed-forward torque command generator from a torque command value based on a deviation between the velocity command value generated by the velocity command value generator and a measured velocity of the rotary body; and outputs the first torque command value, or outputs the torque command value as a second torque command value with a larger absolute value than the first torque command value.

5. A swing control device that controls a rotary body rotated by an electric motor, the swing control device comprising:

a velocity command value generator that generates a velocity command value for the electric motor;

a work equipment velocity command value generator that generates a work equipment velocity command value of a work equipment provided on the rotary body;

a velocity command value comparator that compares the work equipment velocity command value generated by the work equipment velocity command value generator with a predetermined value; and a torque command value generator that:

generates a first torque command value;

generates a second torque command value with a larger absolute value than the first torque command value based on a deviation between the velocity command value and a measured velocity of the rotary body; and outputs one of the first torque command value and the second torque command value based on a determination result of the velocity command value comparator.

6. A swing control device that controls a rotary body rotated by an electric motor, the swing control device comprising:

a first velocity command value generator that generates a first velocity command value for the electric motor;

a work equipment velocity command value generator that generates a work equipment velocity command value of a work equipment provided on the rotary body;

a second velocity command value generator that generates a second velocity command value based on the work equipment velocity command value generated by the work equipment velocity command value generator; and a torque command value generator that:

generates a first torque command value based on a deviation between a velocity command value obtained by subtracting the second velocity command value generated by the second velocity command value generator from the first velocity command value generated by the first velocity command value generator and a measured velocity of the rotary body;

generates a second torque command value with a larger absolute value than the first torque command value based on a deviation between the first velocity command value generated by the first velocity command value generator and the measured velocity of the rotary body; and outputs one of the first torque command value and the second torque command value.

* * * * *